(12) United States Patent
Gomes et al.

(10) Patent No.: US 7,343,386 B2
(45) Date of Patent: Mar. 11, 2008

(54) TECHNIQUES SUPPORTING COLLABORATIVE PRODUCT DEVELOPMENT

(75) Inventors: José Gomes, Douglaston, NY (US); Man Mohan Singh, Yorktown Heights, NY (US); Mila Keren, Nesher (IL); Sai Zeng, Elmsford, NY (US); Julia Rubin, Rechasim (IL); Laurent Balmelli, White Plains, NY (US); Ioana Boier-Martin, Pelham Manor, NY (US)

(73) Assignee: International Business Machines Corporation, Armonk, NY (US)

( * ) Notice: Subject to any disclaimer, the term of this patent is extended or adjusted under 35 U.S.C. 154(b) by 565 days.

(21) Appl. No.: 11/048,001

(22) Filed: Jan. 31, 2005

(65) Prior Publication Data

US 2006/0174190 A1    Aug. 3, 2006

(51) Int. Cl.
*G06F 17/30*    (2006.01)
(52) U.S. Cl. .................... 707/203; 707/205; 700/97
(58) Field of Classification Search ................... None
See application file for complete search history.

(56) References Cited

U.S. PATENT DOCUMENTS

| | | | | |
|---|---|---|---|---|
| 4,809,170 | A * | 2/1989 | Leblang et al. | 717/122 |
| 6,789,252 | B1 * | 9/2004 | Burke et al. | 717/100 |
| 6,877,153 | B2 * | 4/2005 | Konnersman | 717/100 |
| 6,910,204 | B1 * | 6/2005 | Rossomando | 717/108 |
| 7,020,304 | B2 * | 3/2006 | Alattar et al. | 382/100 |
| 2002/0103818 | A1 * | 8/2002 | Amberden | 707/205 |
| 2004/0030992 | A1 * | 2/2004 | Moisa et al. | 715/513 |
| 2004/0204957 | A1 * | 10/2004 | Afeyan et al. | 705/1 |
| 2005/0080502 | A1 * | 4/2005 | Chernyak et al. | 700/97 |
| 2005/0119984 | A1 * | 6/2005 | Rouvellou et al. | 706/47 |
| 2006/0053194 | A1 * | 3/2006 | Schneider et al. | 709/204 |
| 2006/0064481 | A1 * | 3/2006 | Baron et al. | 709/224 |
| 2007/0191979 | A1 * | 8/2007 | Zeng et al. | 700/97 |

OTHER PUBLICATIONS

Tien N. Nguyen and Ethan V. Munson and John T. Boyland, "The Molhado Hypertext Versioning System", Aug. 2004, Proceedings of the 15th ACM conference on Hypertext and Hypermedia HYPERTEXT '04, pp. 185-194.*

(Continued)

*Primary Examiner*—Charles Rones
*Assistant Examiner*—Michele C. Choi
(74) *Attorney, Agent, or Firm*—Harrington & Smith, PC (57) ABSTRACT

A plurality of artifacts, in a plurality of repositories, are maintained under revision control. A plurality of artifact tuples, in another repository, are maintained under revision control. At least one first artifact tuple comprise first information providing access to at least one of the artifacts. At least one second artifact tuple comprises second information providing access to at least one other artifact tuple. Each of the artifact tuples are associated with at least one of a plurality of product development processes. An apparatus comprises a plurality of repositories, each maintaining under revision control a plurality of artifacts and another repository that maintains under revision control a plurality of artifact tuples. A workflow process is adapted to allow users to associate each of the artifact tuples with at least one of a plurality of product development processes.

11 Claims, 10 Drawing Sheets

OTHER PUBLICATIONS

Byong G. Lee, Kai H. Chang, and N. Hari Narayanan, "An Integrated Approach to Version Control Management in Computer Supported Collaborative Writing", Apr. 1998, Proceedings of the 36th Annual Southeast Regional Conference ACM-SE 36, pp. 34-43.*

Hideki Koike and Hui-Chu Chu, "VRCS: Integrating Version Control and Module Management Using Interactive Three-Dimensional Graphics", Sep. 1997, 1997 IEEE Symposium on Sep. 23-26, 1997, pp. 168-173.*

Jacky Estublier, "Software Configuration Management: A Roadmap", May 2000, Proceedings of the Conference on The Future of Software Engineering ICSE '00, pp. 1-9.*

Balmelli, L. et al., "Requirement Modeling for System Engineering Using SysML, The Systems Modeling Language", In. Proc. Of DETC, Computers & Information in Engineering Conf., Salt Lake City, Utah (2004), pp. 1-6.

* cited by examiner

TECHNIQUES SUPPORTING COLLABORATIVE PRODUCT DEVELOPMENT

TECHNICAL FIELD

This invention relates generally to product development and, more specifically, relates to computer-aided product development.

BACKGROUND OF THE INVENTION

Product development has become increasing complex. Take, as an example, development of a product for an automobile. In the past, the product would be drawn entirely by hand and developed by engineers who had to interface manually the part with other products in the automobile. An advance over that type of product development was computer aided design (CAD) tools, which allowed two-dimensional and three-dimensional product design and could include parts lists and even costs for the resultant product. A further advance in product development was a workflow system adapted for product design. For instance, product data management (PDM) systems have become popular, and these systems allow scheduling of resources, such as engineers, to design tasks, provide time schedules for design tasks, and provide for abstractions (e.g., CAD files) of products.

PDM systems typically manage artifacts during the product lifecycle. Artifacts are finite and identifiable pieces of digital information produced, consumed or transformed by product development processes. For instance, an artifact could be an abstraction, such as a CAD file, a digital representation of a process of simulating a product, or a record in a database of a design specification.

PDM systems include repositories that maintain artifacts under revision control. Revision control reduces the chance of accidental deletion of artifacts, controls modification and creation of artifacts, provides the ability to return to a previous revision, and provides a history of the lifecycle of a product.

Similar concepts exist in other domains as well. For instance, software configuration management (SCM) systems operate similar to PDM systems but for software products. Thus, SCM systems have artifacts, provide revision control, and provide repositories for artifacts.

While PDM and SCM are useful for their respective domains, new products being designed currently incorporate both mechanical (typically managed using PDM systems) components and software (typically managed using SCM systems) components. For instance, automobiles today typically have at least an engine control unit (ECU) controlling functions of the engine and generally have other embedded systems operating everything from automatic climate control to informational displays, to global positioning satellite (GPS) displays and interfaces.

The interface between PDM and SCM systems can be problematic, and it would therefore be desirable to provide techniques that minimize or eliminate these problems.

BRIEF SUMMARY OF THE INVENTION

The present invention provides techniques that allow management of collaboration during product development. For instance, the present invention can provide management of collaboration between PDM systems and SCM systems. Illustratively, inter-disciplinary product development processes can be implemented that combine artifacts from many domains.

In an exemplary aspect of the invention, a computer-implemented method is disclosed that supports collaborative product development. The method comprises the following steps. A plurality of artifacts, in a plurality of repositories, are maintained under revision control. A plurality of artifact tuples, in another repository, are maintained under revision control. At least one first artifact tuple comprise first information providing access to at least one of the artifacts. At least one second artifact tuple comprises second information providing access to at least one other artifact tuple. Each of the artifact tuples are associated with at least one of a plurality of product development processes.

In another exemplary embodiment, an apparatus supporting collaborative product development comprises at least one memory and at least one processor coupled to the at least one memory. The at least one processor is configured to perform the steps of (1) maintaining under revision control, in a plurality of repositories, a plurality of artifacts; (2) maintaining under revision control, in another repository, a plurality of artifact tuples, at least one first artifact tuple comprising first information providing access to at least one of the artifacts, and at least one second artifact tuple comprising second information providing access to at least one other artifact tuple; and (3) associating each of the artifact tuples with at least one of a plurality of product development processes.

In another exemplary embodiment, a program storage device is disclosed that tangibly embodies a program of machine-readable instructions executable by a digital processing apparatus to perform operations supporting collaborative product development. The operations comprise (1) maintaining under revision control, in a plurality of repositories, a plurality of artifacts; (2) maintaining under revision control, in another repository, a plurality of artifact tuples, at least one first artifact tuple comprising first information providing access to at least one of the artifacts, and at least one second artifact tuple comprising second information providing access to at least one other artifact tuple; and (3) associating each of the artifact tuples with at least one of a plurality of product development processes.

In another exemplary aspect of the invention, an apparatus is disclosed that supports collaborative product development. The apparatus comprises a plurality of repositories. Each repository maintains under revision control a plurality of artifacts. The apparatus also comprises another repository. The other repository maintains under revision control a plurality of artifact tuples. At least one first artifact tuple comprises first information providing access to at least one of the artifacts. At least one second artifact tuple comprises second information providing access to at least one other artifact tuple. The apparatus also comprises a workflow process adapted to allow users to associate each of the artifact tuples with at least one of a plurality of product development processes.

BRIEF DESCRIPTION OF THE DRAWINGS

The foregoing and other aspects of embodiments of this invention are made more evident in the following Detailed Description of Exemplary Embodiments, when read in conjunction with the attached Drawing Figures, wherein.

DETAILED DESCRIPTION OF EXEMPLARY EMBODIMENTS

For ease of reference, the present disclosure is divided into an Introduction section and a System Data Management section.

1. Introduction

As described above, there are systems designed to help with product development. This section provides a further overview of these systems and the problems associated with integrating the systems.

The manufacturing industry has long been developing complex products such as passenger vehicles. Historically, for the sake of economic rationalization, the manufacturing industry has evolved into complex business-to-business networks of original equipment manufacturers, specialized suppliers, and even more specialized suppliers of suppliers. The product development methods used by the manufacturing industry have evolved to adjust to this industry organization and to focus more on integration. Today, the industry continues to evolve in response to changing conditions.

One of the most important changes, currently taking place, is increasing dependency on embedded software content in new products. Embedded software is increasingly being used to manage complex mechanical and electronic components and to implement unique new product functions and features. This trend is evident from the need of manufacturers to differentiate their products from their competitors and the increase in customer demand for new electronic features. This new trend implies that there is an increased focus on new integrated product development paradigms, otherwise, manufacturers stand to suffer tremendous risks in costs associated with product delays, warranty and liability.

From the standpoint of product development, this is of special interest because, in the recent past, development organizations across various design disciplines have worked in "silos" and differ in terms of culture, practices, processes, tools, representations, and concrete artifacts. Basic paradigms of software engineering are quite different from those of the traditionally dominant mechanical and electrical engineering disciplines.

A noticeable trend in the industry, moving in this direction, is to consider the promises of Requirements Engineering, Systems Engineering or Model-Driven Development disciplines as applied to the development of a "whole" product. Various systems-engineering approaches to product development stress on requirements engineering and inter-disciplinary collaboration throughout the product lifecycle while model-driven development emphasizes creation of product models as seen from the perspective of its stakeholders. The product is seen as a system delivering a measurable value as a whole, rather than as the sum of its individual components such as mechanical, electrical, electronics and software.

The proponents of such holistic methods claim that raising the level of abstraction above traditional engineering disciplines has the potential to connect the manufacturer's business drivers to detailed development processes. An additional conclusion that can be asserted is that these new product models can themselves become valuable reusable assets for the manufacturers.

Objectively, one could as well argue that it is not clear why the claimed benefits would counter-balance the cost of managing an even higher number of disciplines, associated artifacts, and processes. A second equally valid concern is that abstract models "on the paper" may not reflect well the day to day reality of engineering processes and therefore may not be relevant to effective decision-making processes.

While multiple studies confirm the business benefits of holistic methods, relatively little attention has been paid to the second concern, and this is the focus of this paper. It is clear that abstract models, such as Systems Modeling Language (SysML) models of products and processes, can only be useful if they faithfully reflect the realities of the day. SysML is discussed in Balmelli, L. and Moore, A., "Requirement Modeling for System Engineering using SysML, The Systems Modeling Language," In Proc. of DETC, Computers & Information in Engineering Conf., Salt Lake City (2004). For instance, design tradeoff analysis or impact analysis of design changes are key systems-engineering processes for effective decision-making. However, the results of such analysis are only as accurate as the connection between the SysML model and the associated concrete artifacts representing processes and domain specific knowledge.

A central aspect of the holistic approaches to product development involves maintaining the integrity and evolution of inter-relationships of various discipline- or stakeholder-specific system abstractions (e.g., which can be represented by artifacts) during the product lifecycle. This is important if one has to effectively apply the systems-engineering methods for product development. Maintenance of this traceability of artifacts is achieved through inter-disciplinary collaborations. The term "traceability" is used to mean the associations between artifacts needed to support specific systems engineering processes through multi-disciplinary collaborations.

In the traditional product lifecycle management (PLM) approach to product development, product data management (PDM) or engineering data management (EDM) is the discipline of designing and controlling the evolution of a product from its mechanical, electrical, and electronics engineering aspects, whereas, software configuration management (SCM) is the discipline of controlling the evolution of software engineering aspects of the product. The artifacts of requirements engineering are either managed in PDM or SCM systems, or more often, are not afforded formal treatment. At a conceptual level, there are many similarities between PDM and SCM; however, there are also major differences because of the nature of the supported artifacts and processes.

When applying a systems-engineering approach to product development, there have been attempts to manage software engineering artifacts within PDM systems and, similarly, to manage mechanical and electrical engineering artifacts in SCM systems, but these solutions have not been very satisfactory or successful. PDM tools are strong in product modeling, they have a long standing and now standardized product evolution control know how, but they are weak in concurrent engineering, work space control and process support. SCM tools are more recent; they are good at managing files and tools, but weak in product modeling, product evolution and process support.

An alternate approach that has been tried is the point-to-point integration between specific PDM and SCM products by invoking import/export functionality of the underlying databases to maintain integrity of the two different product data representations. However, such integration efforts have turned out to be very complex in nature and there is a high risk that the data integrity across the two systems cannot be maintained.

Looking at the problem from a model-driven development standpoint, yet another approach seems natural: assume that artifacts are kept within their native development environments, for instance, hardware in PDM and software in SCM. Further, assume that, for example, the overall system is described in a SysML model; it is tempting to implement inter-disciplinary traceability by directly associating each SysML model element to the relevant concrete artifacts in other disciplines. One limitation of this solution, though, is that it is difficult a priori, to decide which concrete artifacts are associated with a given SysML element. In effect, the associations mainly derive from the specific product development practices in use. There are potentially as many different associations of very different nature as there are different processes involving the same SysML model element. For instance, part of a SysML model could be reused in different parts of a product, or even in different products. This situation makes it clear that the SysML model itself should not be the root of the traceability to the concrete artifacts.

Even though inter-disciplinary collaboration is a central tenet of systems engineering, as trends in system development take an integrated approach, the state of the art to achieve such collaboration is too weak to be effective. We therefore investigate an alternative approach to supporting inter-disciplinary collaboration, as described in the next section.

2. Examples of System Data Management

System data management (SDM), as described herein, is in certain embodiments a collaboration and infrastructure pattern. A role of SDM is to manage (e.g., support) inter-disciplinary collaboration processes so as to maintain the integrity of a system as specified by a set of product development artifacts concurrently authored by multiple teams. This concept and its hypotheses are described in this section.

2.1 Intra- and Inter-Disciplinary Collaboration

Figure 1:
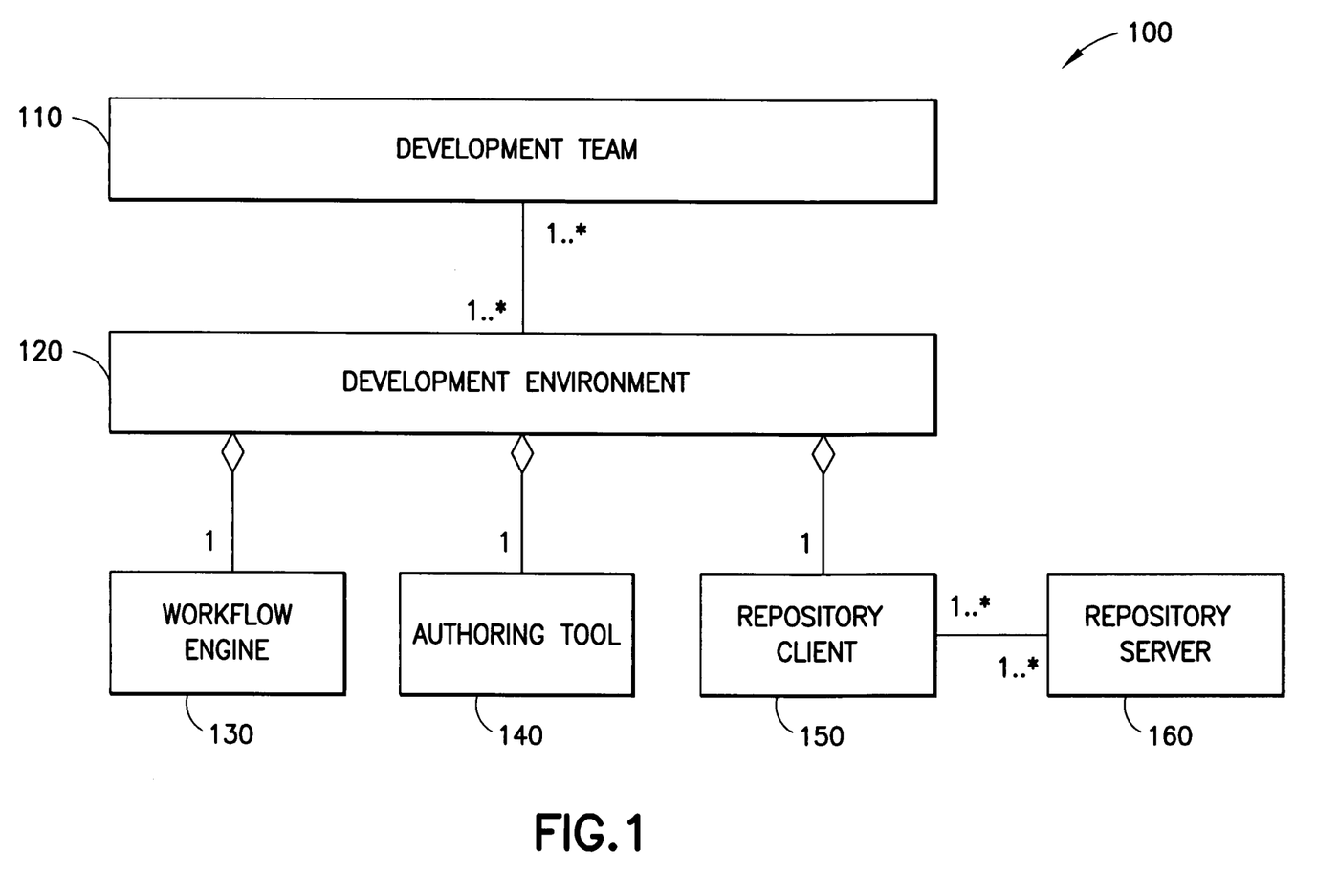
FIG. 1 illustrates an exemplary intra-disciplinary product development infrastructure pattern used to develop a product.
Figure 2:
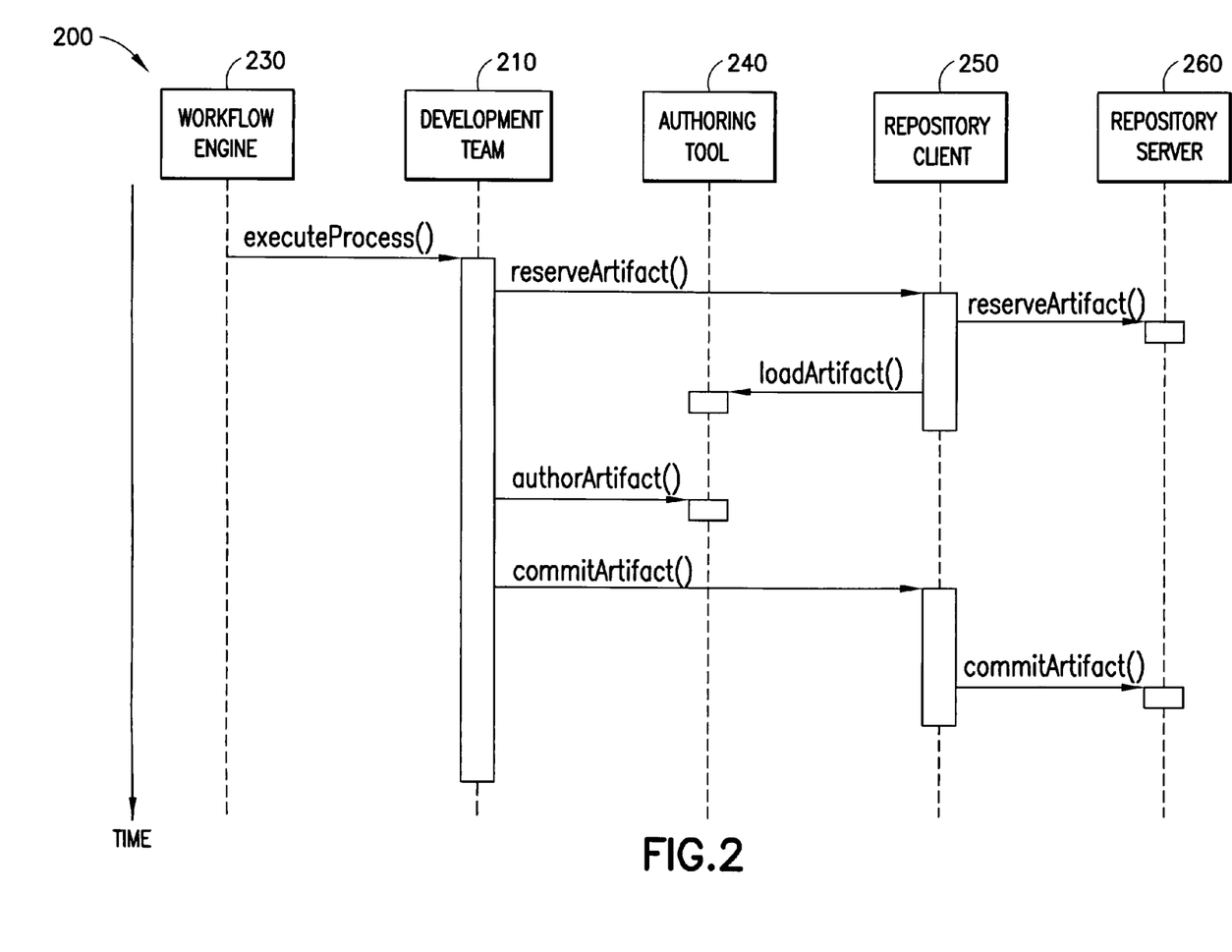
FIG. 2 illustrates an intra-disciplinary product development collaboration pattern for the exemplary infrastructure pattern of FIG. 1.

It is assumed that product development processes may be classified as intra-disciplinary or inter-disciplinary. An intra-disciplinary product development process is executed by a development team within a single discipline and involves authoring artifacts of this discipline only specific to the domain of that discipline. FIG. 1 and FIG. 2 represent a typical intra-disciplinary product development infrastructure and collaboration pattern, respectively, at a level of detail sufficient to introduce certain SDM concepts.

Referring now to FIG. 1, an exemplary intra-disciplinary product development infrastructure pattern 100 is shown that used to create a product development repository. The pattern 100 comprises the following classes: a development team class 110; a development environment class 120; a workflow engine class 130; an authoring tool class 140; a repository client class 150; and a repository server class 160.

Turning to FIG. 2, an intra-disciplinary product development collaboration pattern 200 is shown for the exemplary infrastructure pattern 100 of FIG. 1. FIG. 2 shows how objects derived from the classes shown in FIG. 1 might interact. A workflow engine object 230 performs an executeProcess( ) method. In response, a development team object 210 performs a reserveArtifact( ) method that accesses the repository client object 250. The repository client object 250 performs a reserveArtifact( ) method that accesses a repository server object 260 and reserves an artifact for maintenance (e.g., creation, updating, or possibly deletion). This reservation typically includes revision control, although such revision control might also take place in other methods, such as the authorArtifact( ) method and/or the commitArtifact( ) method performed on the repository server object 260. The repository client object 250 also performs a loadArtifact( ) method to load the artifact. The development team object 210 also performs an authorArtifact( ) method on the authoring tool object 240 to maintain the artifact. The development team object 210 performs a commitArtifact( ) method (e.g., to store updates to the artifact) on the repository client 250. The repository client object 250 also performs a commitArtifact( ) method on the repository server object 260.

Referring to both FIGS. 1 and 2, artifacts are under the revision control of one or more discipline-specific product development repositories (e.g., defined by the intra-disciplinary product development infrastructure pattern 100 of FIG. 1). Thus, discipline-specific product development repositories are, for instance, PDM and SCM systems, although any system using artifacts may be used. The development environment of a team includes a workflow engine (130, 230) used to involve the team in a prescribed product development process, a repository client (150, 250) used to reserve and commit artifacts to the common repository, and authoring tools (140, 250) used to maintain artifacts in workspaces of the developers.

In contrast, an inter-disciplinary product development process is executed by a multi-disciplinary team and involves the coordinated concurrent authoring of artifacts belonging to different disciplines so as to guaranty the integrity of the product (e.g., system) being developed. Examples of inter-disciplinary product development processes are those prescribed by systems engineering best practices. Very specific examples are requirements coverage analysis (e.g., "Is this requirement being taken into account in the design?"), requirements conformance analysis (e.g., "Is this requirement actually satisfied by the design?"), impact or tradeoff analysis (e.g., "What if?"), and system-level requirements verification. Unlike intra-disciplinary collaboration, there exists no de facto inter-disciplinary collaboration and infrastructure pattern.

The relevance of this classification (i.e., intra- and inter-disciplinary) of product development processes arises in particular from growing evidence in the industry that most quality concerns of modern products primarily result from poor inter-disciplinary collaboration.

2.2 Exemplary Process-Centric Support for Inter-Disciplinary Collaboration

SDM therefore aims at managing, in an exemplary embodiment, inter-disciplinary collaboration and may comprise a collaboration and infrastructure pattern. It is assumed that the pattern depicted in FIGS. 1 and 2, described above, adequately supports intra-disciplinary collaboration within any individual discipline, although other patterns may be used. To understand the concept of SDM, it is beneficial to know the reasons the pattern in FIGS. 1 and 2 is typically not appropriate for inter-disciplinary product development processes. Two arguments will now be presented.

A careful examination of existing PDM and SCM systems shows how qualitatively different are discipline-specific implementations of the pattern of FIGS. 1 and 2. The detailed data models, evolution models, and interfaces arise from specific needs and development paradigms of its discipline. These are often not known by users of other disciplines, neither should they need to be known. In these circumstances, it might be unrealistic to reconcile so many different data models and associated practices into a universal practice, as dictated by the patterns of FIGS. 1 and 2. This motivates the need to investigate inter-disciplinary collaboration and infrastructure patterns that will respect these multiple de facto discipline-specific infrastructures and leverage them "as is," if possible.

Another argument is the existence of strategic investments in PDM and SCM implementations in organizations traditionally dominated by a specific engineering discipline. One might want to preserve these investments. This provides additional reasons to consider an integration approach that does not violate, but instead leverages, the existing patterns.

To understand the concept of SDM, it is also beneficial to know an exemplary positioning of SDM with respect to systems engineering artifacts and practices. The discipline of systems engineering, in many regards, does support inter-disciplinary collaboration. In effect, artifacts of systems engineering, such as Systems Modeling Language (SysML) systems models, allow the joint expression of mechanical, electrical, electronics, software and requirements aspects in a common language. This offers a basis for reasoning, and therefore making decisions, on the system structures and behaviors which will best satisfy all the product and product development requirements. However, from another perspective, systems engineering is merely another discipline. This point is further illustrated as follows. The set of all development artifacts associated with a given product typically contains artifacts (the first subset) representing individual components of the system and artifacts (the second subset) representing the integrated system. The first subset might contain for instance CAD or computer aided engineering (CAE) documents, specifications, software code, or test cases. The second subset might contain SysML models or any other description of how all these components should fit together to form the whole.

However, an important information gap is a set of concrete links existing between the system artifacts and the components artifacts, where all these artifacts are seen as different "physical" resources having identifiable addresses in specific repositories. The SysML model does not contain this information and, from one standpoint, is merely such as a resource itself. The SDM systems described herein contain the traceability information, in the form, e.g., of artifact tuples and information contained therein.

Figure 3:
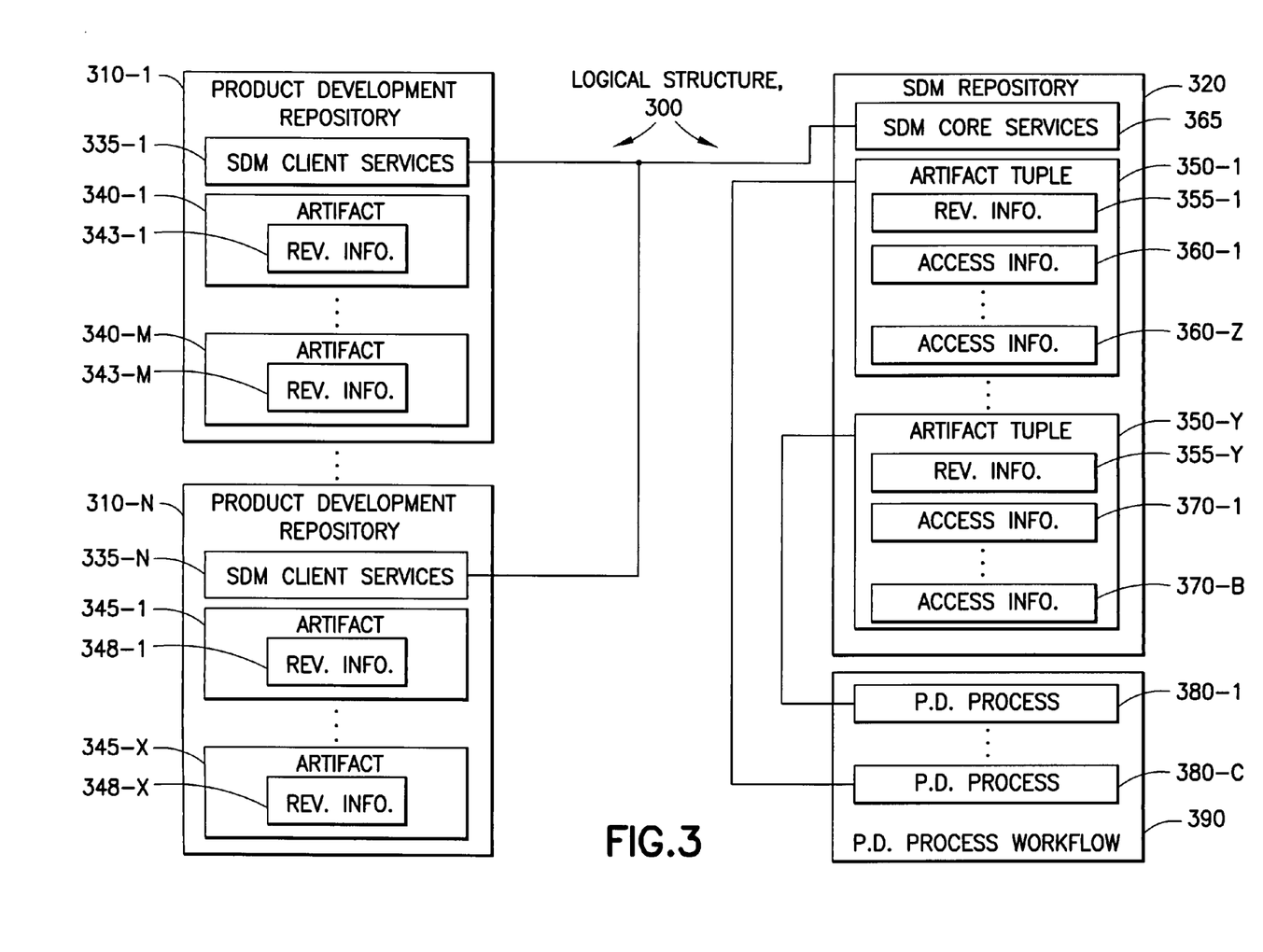
FIG. 3 is a block diagram illustrating a logical structure of an exemplary System Data Management (SDM) system in accordance with an exemplary embodiment of the present invention.

Turning now to FIG. 3, a logical structure 300 for an SDM system is shown that comprises product development repositories 310-1 through 310-N, an SDM repository 320, and a product development process workflow 390. As shown in more detail in FIG. 8, an SDM system is typically implemented as a distributed computer system comprising a plurality of computer systems, each computer system comprising one or more processors and one or more memories. FIG. 3, by contrast, simply illustrates a logical structure 300 of an SDM system and the individual components may physically reside on one or more computer systems.

Product development repository 310-1 comprises an SDM client services object 335-1 and artifacts 340-1 through 340-M. Each artifact 340 comprises, in this example, revision information 343. Similarly, product development repository 310-N comprises an SDM client services object 335-N and artifacts 345-1 through 345-X. Each artifact 345 comprises, in this example, revision information 348.

The SDM repository 320 comprises SDM core services object 365, artifact tuples 350-1 through 350-Y, and associations to product development processes 380-1 through 380-C. The product development processes 380-1 through 380-C are part of the product development process workflow 390, which provides inter-disciplinary product development processes. In the example of FIG. 3, the artifact tuple 355-1 comprises revision information 355-1 and access information 360-1 through 360-Z. The artifact tuple 355-Y comprises revision information 355-Y and access information 370-1 through 370-Z. An example of a product development process 380 is shown in FIG. 4B.

In the exemplary embodiment of FIG. 3, each product development repository 310 is a discipline-specific product development repository, such as a PDM system or an SCM system. Each product development repository 310 maintains artifacts associated therewith (e.g., product development repository 310-1 maintains artifacts 340 and product development repository 310 maintains artifacts 345). Maintenance of artifacts 340, 345 comprises creating, updating (e.g., modification), and other functions performed on artifacts, such as backup, storage, possibly deletion. Additionally, each product development repository 310 has revision control of associated artifacts 340 or 345.

Typically, each artifact 340, 345 would comprise associated revision information 343, 348. However, the revision information 343, 348 can be stored separately from associated artifacts 340, 345.

In an exemplary embodiment of the present invention, each product development repository 310 comprises an SDM client services object 335. Each SDM client services object 335 communicates with an SDM core services object 365. Additional details of the SDM client services object 335 and the SDM core services object 365 are given below, but in brief, the SDM client services object 335 and SDM core services object 365 communicate in order to provide, for instance, indications that artifacts 340, 345 are being tracked. A design team would set up and perform actions for a product development process 380 using the SDM core services object 365 (e.g., and the product development process workflow 390), and a design team would therefore be able to better manage inter-disciplinary collaboration during product development. The setup of a product development process 380 includes determining which artifacts 340, 345 are associated with the product development process 380 and using the product development process workflow 390 to set up the associations. As shown in more detail in FIG. 4B, a product development process 380 associated (e.g., through links or any other technique) to one or more of the artifact tuples 350, and each artifact tuple 350 is associated with at least one product development process 380. Each artifact tuple 350 has associated revision information 355 and one or more access information 360, 370.

As described above, when a product development repository 310 maintains an associated artifact 340, 345, an associated SDM client services object 335 informs the SDM core services object 365 of the maintenance of the artifact. The maintenance of the artifact 340, 345 usually causes a change to associated revision information 343, 348, and the maintenance will also typically cause a corresponding change to revision information 355, as described in reference to FIG. 4B. The SDM repository 320 maintains under revision the artifact tuples 350. Maintenance of artifact tuples 350 comprises creation, updating (e.g., modification), and other functions performed on artifact tuples, such as backup, storage, possibly deletion. Revisions to artifact tuples 350 generally may be made independently of revisions to the artifacts 340, 345. In an exemplary embodiment, the access information 360, 370 comprises all of the information used to access artifacts 340, 345. In this exemplary embodiment, the access information 360, 370 provides "direct" access to the artifacts 340, 345. In another exemplary embodiment (e.g., see FIG. 4B), the access information 360, 370 comprises some of the information needed to access artifacts 340, 345, and another entity will provide additional access information used to access artifacts 340, 345. In this other exemplary embodiment, the access information 360, 370 provides "indirect" access to the artifacts 340, 345.

2.3 Exemplary SDM Data Model

In SDM, discipline-specific artifacts (e.g., artifacts 340, 345) remain under the revision control of their respective product development repositories 310 and additional interdisciplinary traceability information is explicitly captured and managed in an additional repository, SDM repository 320. Within this additional repository, SDM repository 320, traceability information is organized according to the prescribed product development processes 380 supported by the SDM repository 320. For each prescribed product development process 380, the SDM repository 320 records links (e.g., access information 360, 370, and links 435 in FIG. 4B) to the set of artifacts 340, 345 (e.g., seen as a concrete resource) used to implement the product development process 380. The product development process workflow 390 also associates (e.g., under control of a user) a product development process 380 to one or more artifact tuples 350. In the example of FIG. 3, the product development process 380-1 is associated with the artifact tuple 350-Y, while the product development process 380-C is associated with the artifact tuple 350-1. Note the product development processes 380 can be associated with multiple artifact tuples 350 and two or more product development processes 380 may be associated with a given artifact tuple 350, if desired.

Figure 4A:
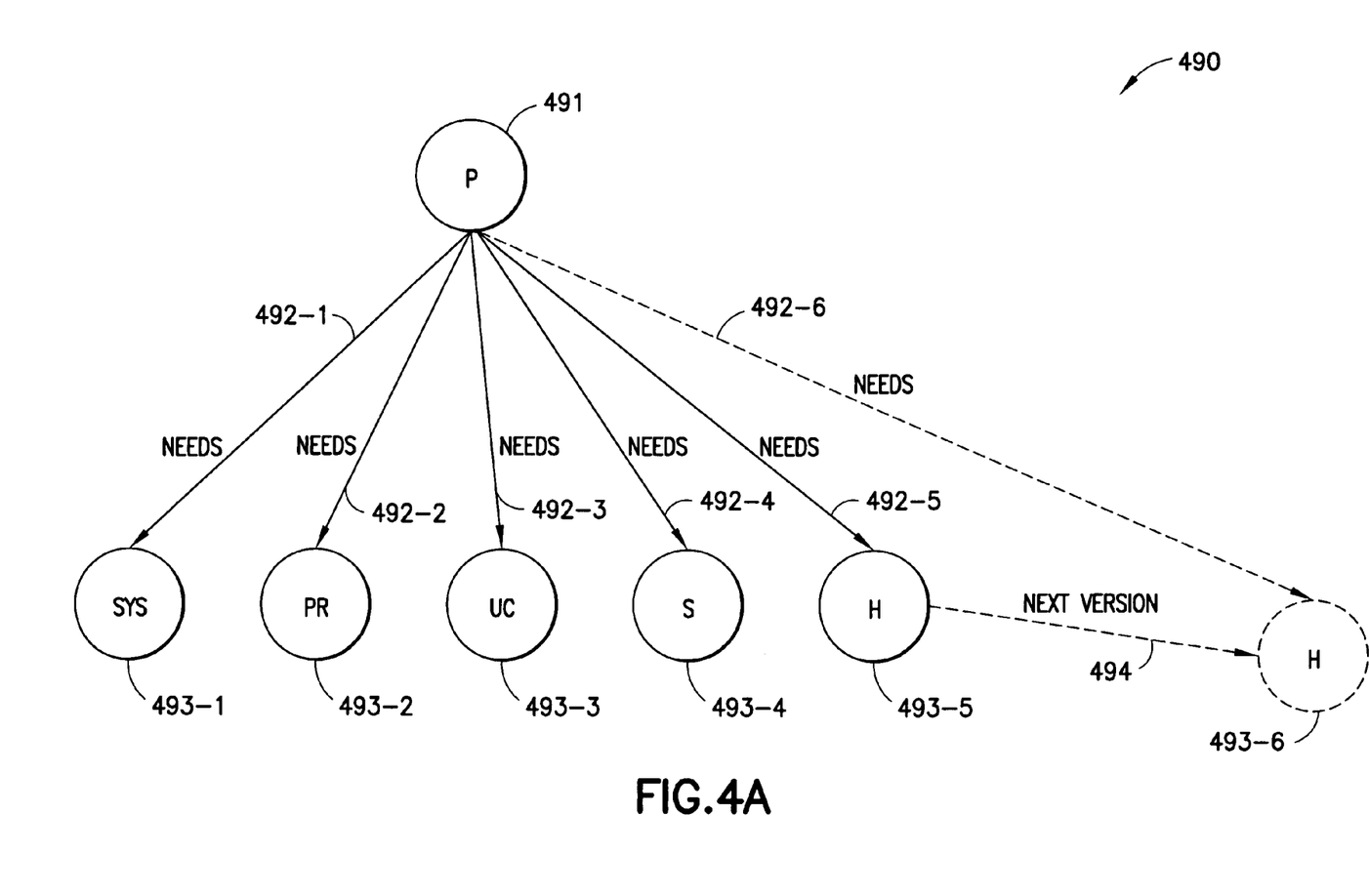
FIG. 4A illustrates a visual representation of one artifact tuple linking a given product development process to a set of multi-disciplinary artifacts needed to execute that process.
Figures 4B, 4B:
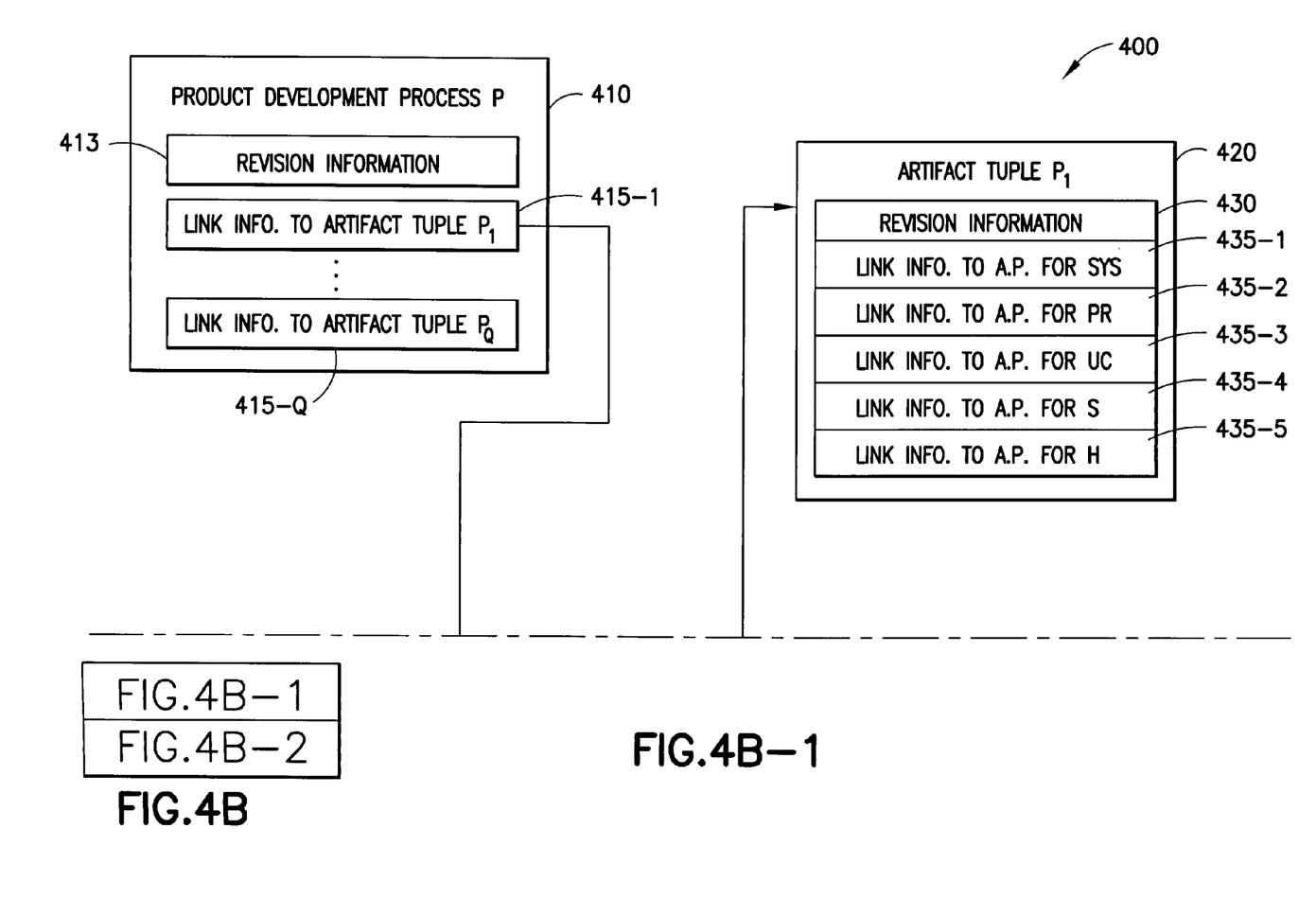
FIG. 4B illustrates a visual representation of the SDM data model portion of FIG. 4A and corresponding logical structure used to access the multi-disciplinary artifacts in accordance with an exemplary embodiment of the present invention.

For illustration, as is shown in FIG. 4A, a given interdisciplinary product development process, P, 401 (e.g., an analysis process) might involve (as illustrated by references 492-1 through 492-5) loading a software program, S, 493-4 on hardware, H, 493-5, executing the software program 493-4 in the context of a use case, UC, 493-3 and verifying that the associated performance requirements, PR, 493-2 are satisfied. The intended relationships between S 493-4, H 493-5, UC 493-3, and PR 493-2 are specified, e.g., in a SysML model, Sys, 493-1. In this case, it is beneficial to know how to access each of the artifacts 340, 345, seen for example as concrete resources.

A problem occurs when a next version 494 of hardware, H, 493-6 is created. How does a system "know" that the hardware, H, 493-5 has been changed to hardware, H, 493-6? Also, how does the system update the process, P, 491 to include (e.g., as indicated through reference 492-6) hardware, H,493-6?

FIGS. 4B and 5-7 show examples that provide traceability and allow modifications to artifact tuples. Turning to FIG. 4B with appropriate reference to FIG. 3, FIG. 4B illustrates a visualization 400 of logical structure of an exemplary SDM data model portion. The visualization 400 comprises the product development process, P, 410 having link information 415-1 through 415-Q. Each link information 415-1 through 415-Q provides a link to an artifact tuple $P_1$ to $P_Q$, respectively, of which artifact tuple 420 (e.g., an artifact tuple 350 in FIG. 3) is shown.

Artifact tuple 420 comprises access information used to access the artifacts 450-1 through 450-5 in their respective product development repositories 310 that are needed to execute product development process 410. An artifact tuple 420 may in turn be pointed to from a parent artifact tuple, if the artifact tuple 420 is part of the resources needed to execute a product development process 410 associated to the parent artifact tuple. The link information 435 is access information (e.g., access information 360, 370) and provides access to artifacts 450.

The resulting graph (e.g., represented by visualization 400) of artifact tuples 420 captures knowledge of how multi-disciplinary artifacts 450 seen typically as concrete resources, are "physically" related to each other. In particular, this knowledge facilitates the re-execution of processes and therefore supports the reuse of entire sub-systems in different contexts. It should be noted that a true graph for a real implication could be much more complex than that shown in FIG. 4B.

Next, supposing that artifact tuples 420 are managed in the new SDM repository (e.g., SDM repository 320) and their associated resources (e.g., associated artifacts 450) are managed in their own repositories (e.g., product development repositories 310), an obvious challenge is to keep traceability links up-to-date as each artifact 450 goes through another revision. For instance, when hardware, H, 450-5 is modified to a next version 460 to hardware, H, 450-6, the question of "how does the SDM repository know that H has now a new version?" may be asked. This can be solved if a negotiation takes place between the SDM repository 320 and the product development repository 310-1 maintaining hardware, H, 450-5. Without this negotiation, process, P, 410 might be performed using wrong data. The visualization in FIG. 4B provides a structure that can modify the reference 440-6 to "point to" the new hardware, H, 450-6 (note that a new product development process, P, 410 may be created to support the new hardware, H, 450-6, depending on implementation).

In an example of SDM, the integrity of artifact tuples 350 is guarantied by a very simple, but strictly enforced query/update collaboration pattern (see FIG. 6) between the SDM repository and the various disciplines-specific repositories. This requires a minimal but beneficial alteration of each of the discipline-specific development environment: the addition of a component providing the "SDM client services" that handle this negotiation each time "Check In" or "Check Out" (for instance) requests are made by the development team. Each instance of this component (e.g., the SDM client services object 335) handles the negotiation with the SDM repository 320 that exposes an SDM core services object 365. This alteration can easily be made transparent to the users by, e.g., programmatically routing requests to reserve or commit artifacts to the SDM client services object 335, instead of directly interacting with the repository client.

Figure 4B:
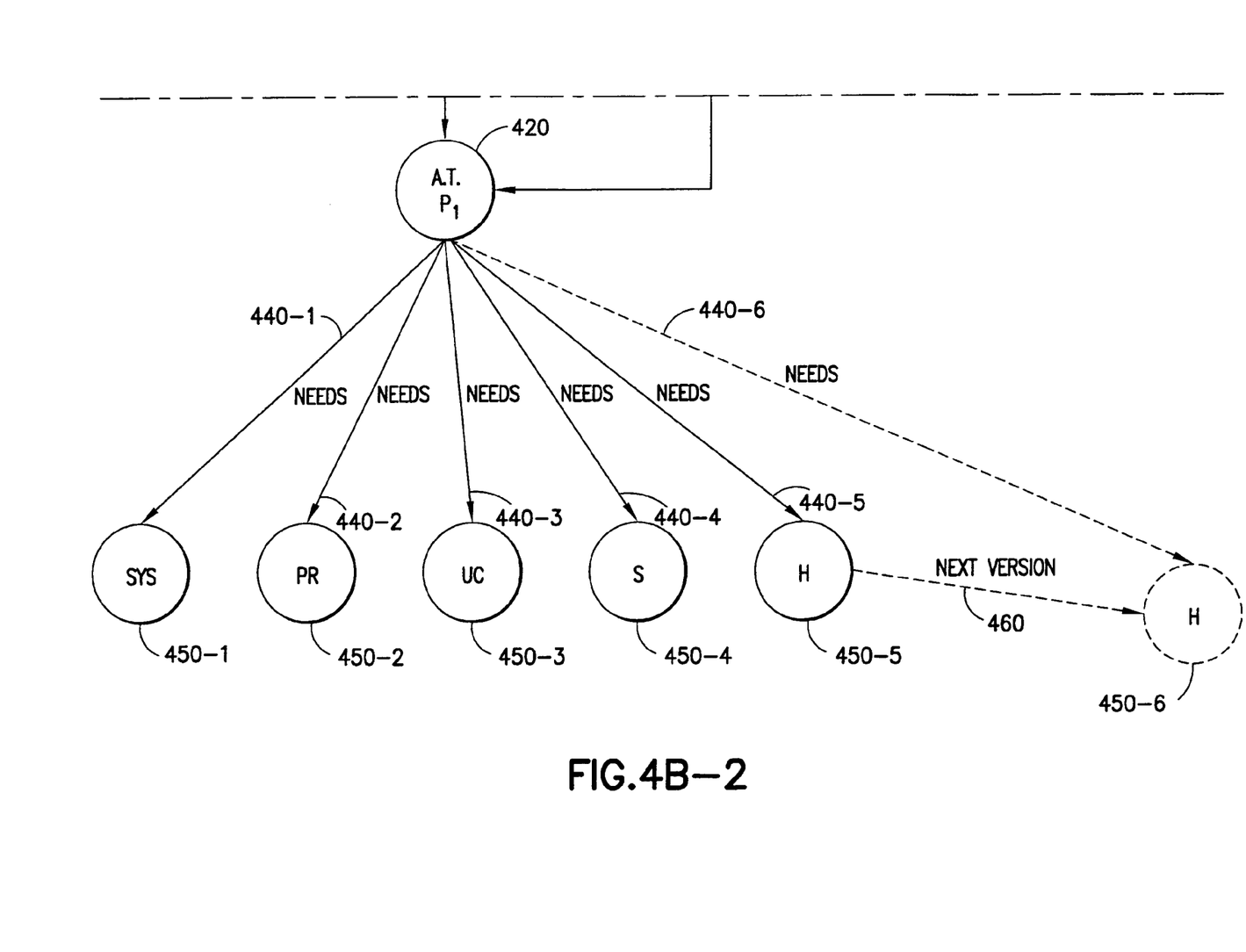

In more detail, the query/update collaboration pattern in an exemplary embodiment functions as follows. When a team member requests to reserve an artifact 340, 345, a corresponding instance of the SDM client services object 335 requests authoring permission to the SDM core services object 365, instead of directly accessing the product development repository 310. The SDM core services object 365 returns detailed access information that is used by the SDM client services object 335 to reserve the artifact 340, 345 on a corresponding product development repository 310. Similarly, when the same team member requests to commit the artifact 340, 345 after having authored the artifact 340, 345, the same instance of the SDM client services object 335 will first commit the artifact 340, 345 to a corresponding product development repository 310 and then notify the SDM core services object 365 of the new access information 360, 370 to be used for the next access of this artifact 340, 345. This alteration of the infrastructure and collaboration pattern is shown in FIGS. 4 and 5, respectively.

Note that although the SDM client services object 335 and the SDM core services object 365 are represented as "objects," they can be software components (e.g., any other entity able to perform the functions associated with the SDM client services object 335 and the SDM core services object 365).

Figure 5:
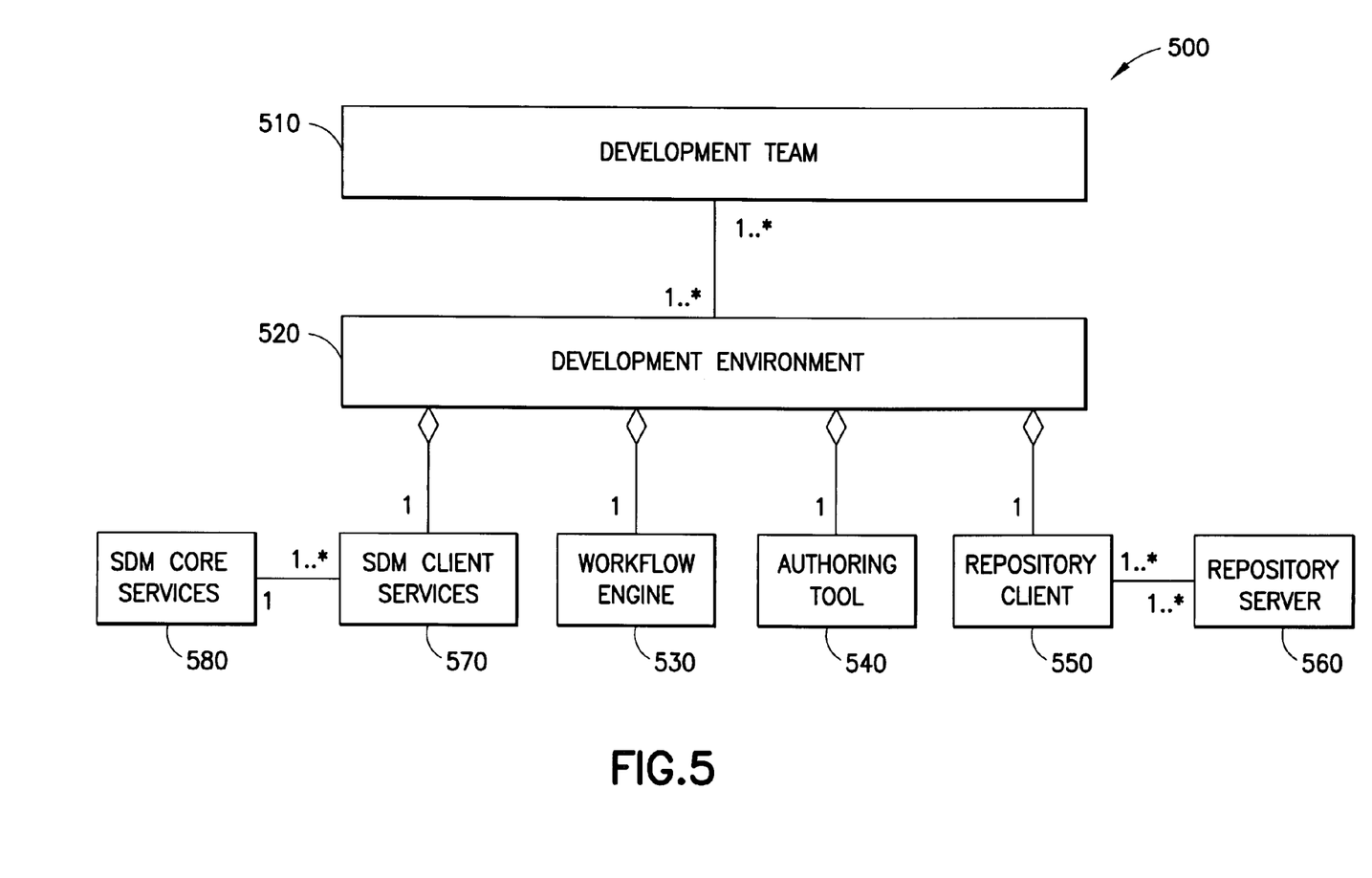
FIG. 5 illustrates an inter-disciplinary infrastructure pattern used to manage the development of a product in accordance with an exemplary embodiment of the present invention.

Turning to FIG. 5, FIG. 5 illustrates an exemplary interdisciplinary infrastructure pattern 500 that is used to create a product development repository (e.g., SDM repository 320) in accordance with an exemplary embodiment of the present invention. The pattern 500 comprises the following classes: a development team class 510; a development environment class 520; a workflow engine class 530; an authoring tool class 540; a repository client class 550; a repository server class 560; an SDM client services class 570, and an SDM core services class 580. The classes 510-550 are modified versions of respective classes 110-150 (see FIG. 1).

Figure 6:
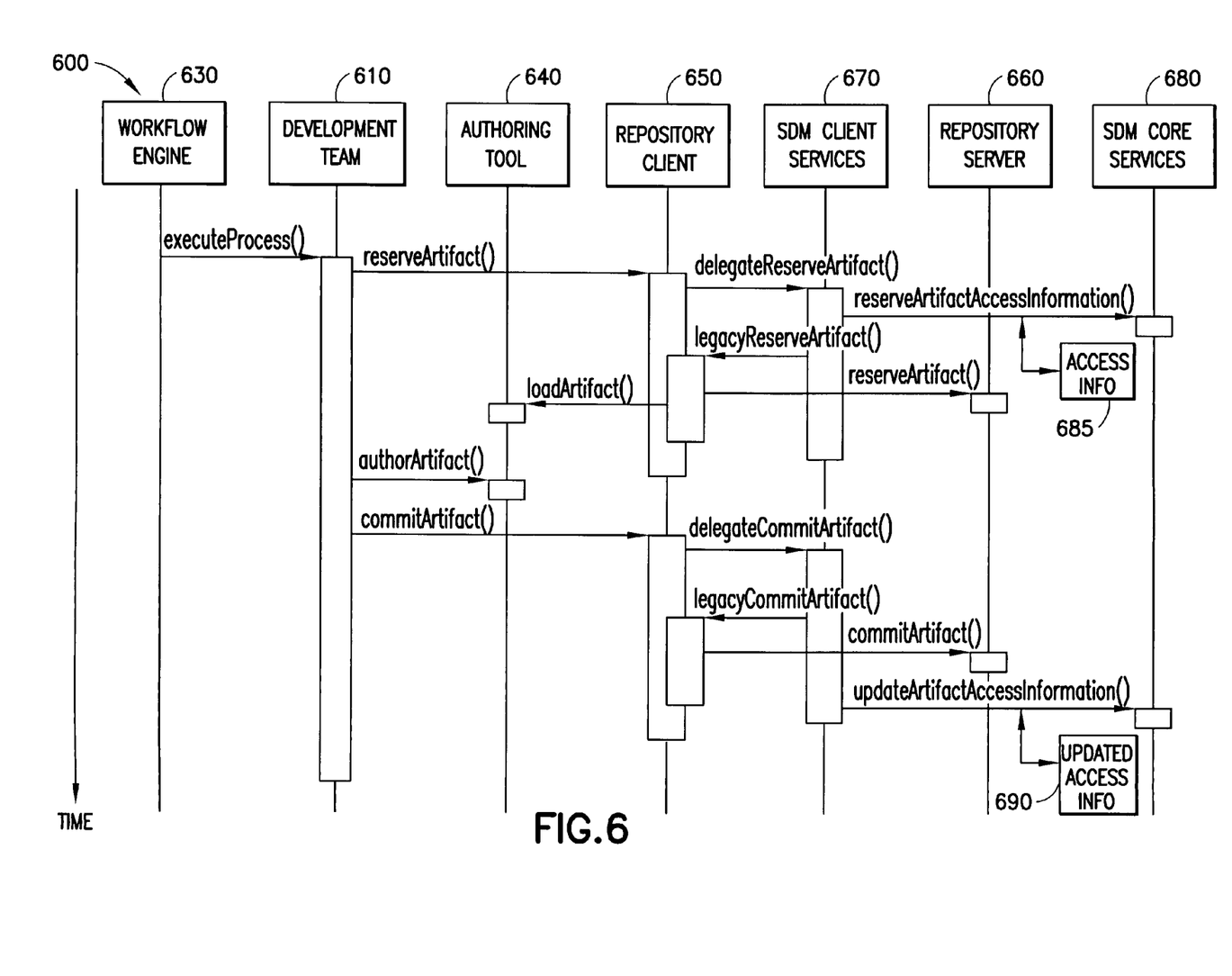
FIG. 6 illustrates an inter-disciplinary product development collaboration pattern for the exemplary infrastructure pattern of FIG. 5.

Turning to FIG. 6, an intra-disciplinary product development collaboration pattern 600 is shown for the exemplary infrastructure pattern 500 of FIG. 5. FIG. 6 shows how objects derived from the classes shown in FIG. 5 might interact. A workflow engine object 630 performs an executeProcess( ) method. In response, a development team object 610 performs a reserveArtifact( ) method that accesses the repository client object 650. The repository client object 650 performs a delgateReserveArtifact( ) method that accesses an SDM client services object 670. The SDM client services object 670 performs a requestArtifactAccessInformation( ) method on an SDM core services object 680. The requestArtifactAccessInformation( ) returns detailed access information 685 to the SDM client services object 670.

The SDM client services object 670 then performs a legacyReserveArtifact( ) method on the repository client object 650. The repository client object 650 performs a reserveArtifact( ) method on the repository server object 660, which reserves an artifact for maintenance (e.g., creation, updating, or possibly deletion). The repository client object 650 also performs a loadArtifact( ) method using the authoring tool object 640 to load the artifact. The development team object 610 performs an authorArtifact( ) method on the authoring tool object 640 to author the artifact.

The development team object 610 performs a commitArtifact( ) method (e.g., to store updates to the artifact) on the repository client 650, which performs a delegateCommitArtifact( ) method on the SDM client services object 670. The SDM client services object 670 performs a legacyCommitArtifact( ) method on the repository client object 650. The repository client object 650 performs a commitArtifact( ) method on the repository server object 660. The SDM client services object 670 performs an updateArtifactAccessInformation( ) method on the SDM core services object 680. The updateArtifactAccessInformation( ) method includes updated access information 690 from the SDM client services object 670.

Another challenge for SDM is that artifacts 340, 345 in different disciplines might follow different evolution models, where an evolution model determines how revisions are made to artifacts 340, 345. Therefore, the details of the negotiations between the SDM client services object 335, 670 and the SDM core services object 365, 680 that track these evolutions might differ depending on the discipline. It can be observed that there are only two basic evolution models: lines (mostly adopted by PDM) and trees (mostly adopted by SCM). The motivation for trees is to have multiple lifecycle branches running simultaneously and allowing, for instance, multiple teams to concurrently author the same artifact 340, 345. This evolution model became plausible thanks to the possibility of analyzing incremental differences between two text files, or for that matter software source code, and merging them into a third file containing all the differences. The difference/merge capability has been extended to many other formats, including system models. Since the tree evolution model is a generalization of the linear one, in SDM, it is assumed in an exemplary embodiment that all the artifacts 340, 345 follow a tree evolution model, although other models may also be implemented. Possible applications of such a general lifecycle model at the system-level include the simultaneous investigation of design alternatives or the simultaneous resolution of independent problems.

Figure 7:
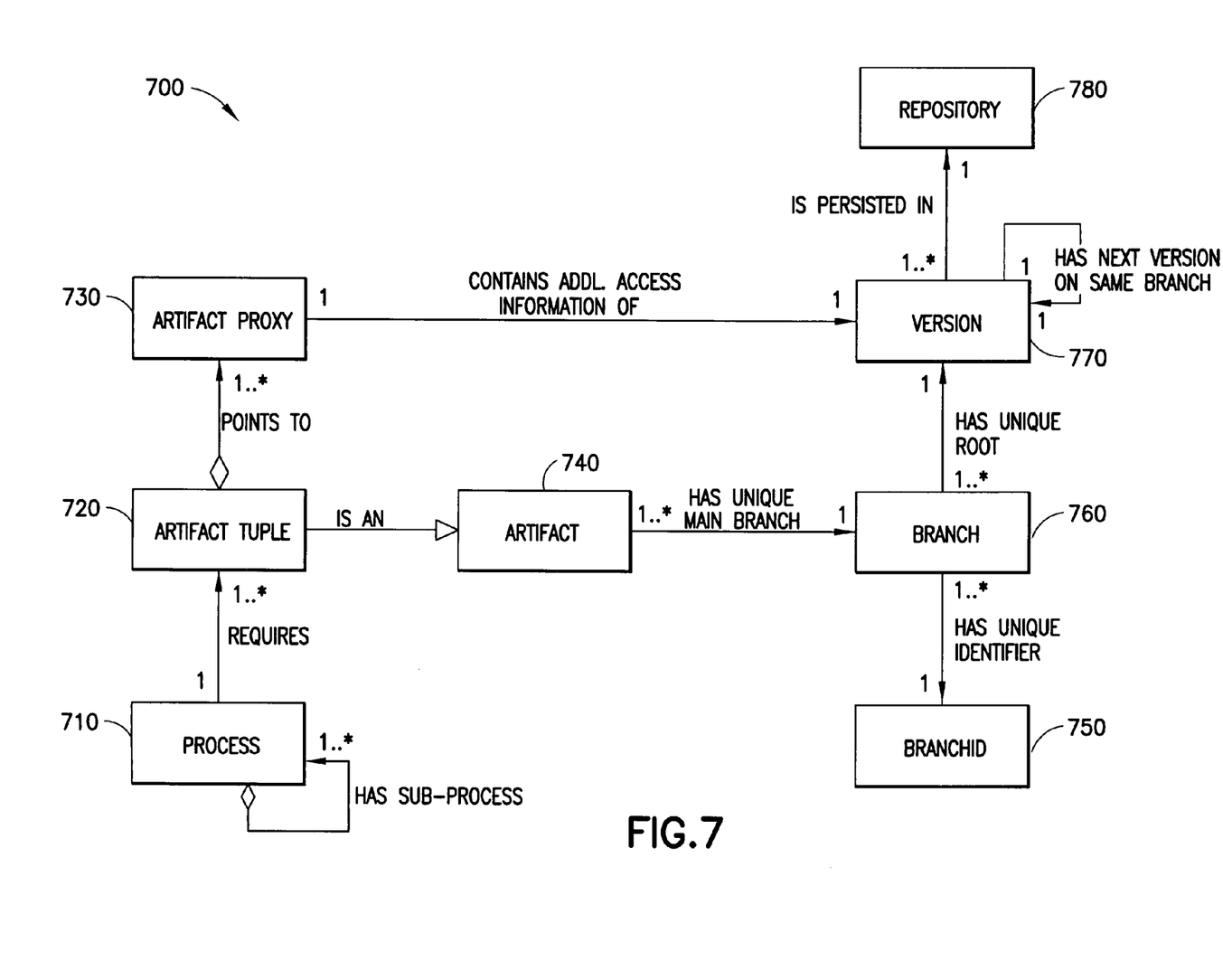
FIG. 7 illustrates an SDM data model for an exemplary SDM system in accordance with an exemplary embodiment of the present invention.

The SDM data model 700, depicted in FIG. 7, summarizes the exemplary relationships discussed in this section. The SDM data model 700 comprises a process class 710, an artifact tuple class 720, an artifact proxy class 730, an artifact 740, a branch identifier (BranchId) class 750, a branch class 760, a version class 770, and a repository class 780. In the example of FIG. 7, the artifact tuple 720 points to artifact proxies 730. Each artifact proxy 730 comprises additional access information for an artifact (implemented as a "version" 770 in this example because each artifact is assumed to have a version). The version 770 is persisted in the repository 780, which could be a product development repository 310 or an SDM repository 320.

It should be noted that the SDM data model 700 is merely exemplary and other data models may be used. However, it is recommended that an artifact tuple still comprises information used to provide and maintain access to a set of artifacts.

Figure 8:
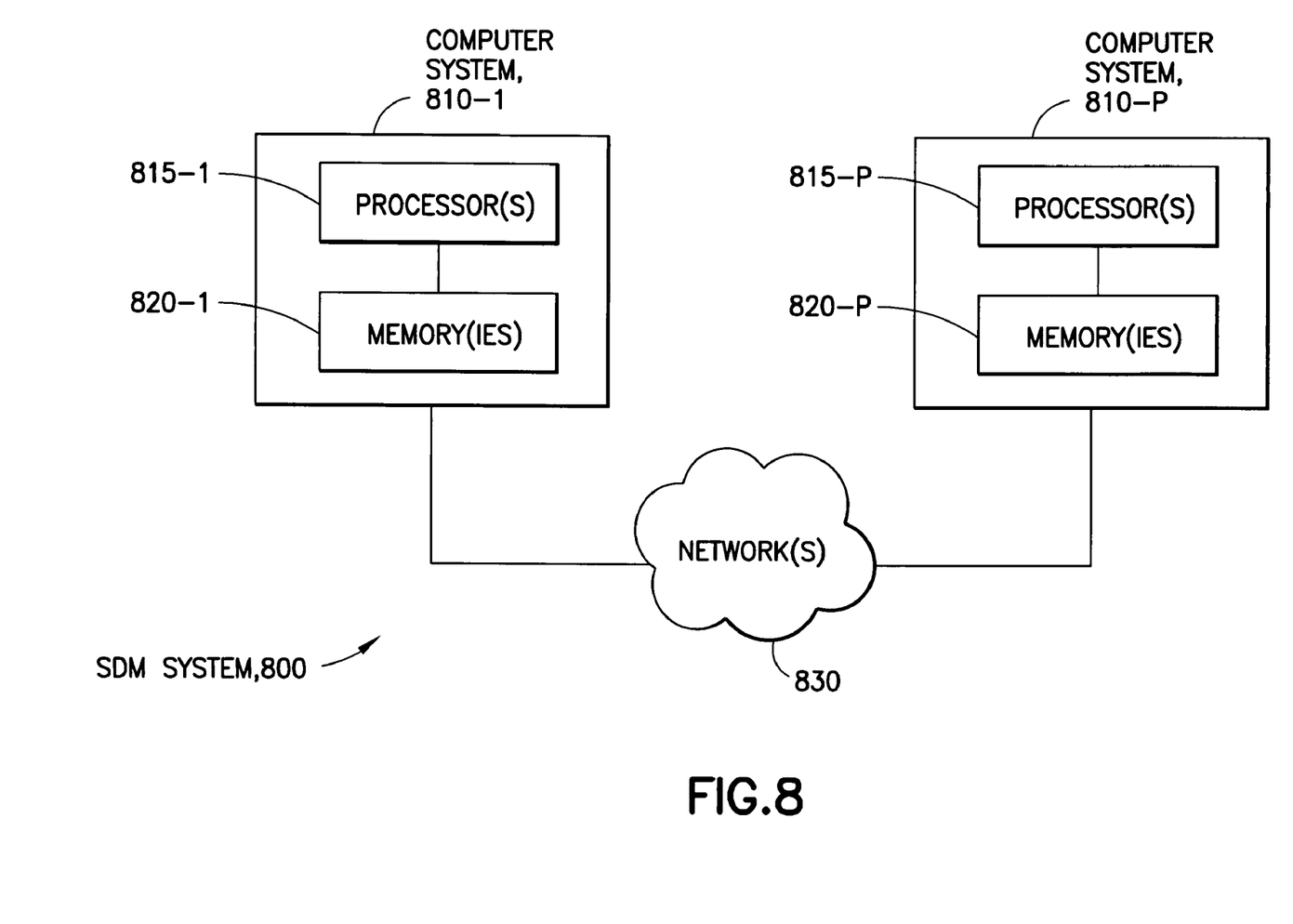
FIG. 8 is a block diagram of an SDM system in accordance with an exemplary embodiment of the present invention.

Turning now to FIG. 8, an SDM system 800 suitable for implementing the present invention is shown. The SDM system 800 is a distributed computer system and comprises computer systems 810-1 through 810-P, each of which comprises one or more processors 815 coupled to one or more memories 820. The computers are connected to one or more networks 830. The SDM system 800 may comprise, as part of memories 820 for instance, a storage medium tangibly embodying a program of machine-readable instructions executable by a digital processing apparatus to perform one or more operations described herein.

The foregoing description has provided by way of exemplary and non-limiting examples a full and informative description of the best method and apparatus presently contemplated by the inventors for carrying out the invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention.

Furthermore, some of the features of exemplary embodiments of this invention could be used to advantage without the corresponding use of other features. As such, the foregoing description should be considered as merely illustrative of the principles of the present invention, and not in limitation thereof.

What is claimed is:

1. A computer-implemented method supporting collaborative product development, comprising:
   maintaining under revision control, in a plurality of repositories, a plurality of artifacts;
   maintaining under revision control, in another repository, a plurality of artifact tuples, at least one first artifact tuple comprising first information providing access to at least one of the artifacts, and at least one second artifact tuple comprising second information providing access to at least one other artifact tuple; and
   associating each of the artifact tuples with at least one of a plurality of product development processes;
   wherein maintaining under revision control a plurality of artifact tuples further comprises updating the second information in response to maintenance of a given one of the at least one other artifact tuples, and further comprises creating a new version of one of the at least one other artifact tuples to create the given other artifact tuple, and creating a new given artifact tuple having the updated second information, the updated second information providing access to the given other artifact tuple.

2. The method of claim 1, wherein a given one of the at least one first artifact tuples and a given one of the at least one second artifact tuples are the same artifact tuple.

3. The method of claim 1, wherein the at least one first artifact tuple and the at least one second artifact tuples are different artifact tuples.

4. The method of claim 1, wherein the first information provides access to at least one first artifact under revision control of a first repository and provides access to at least one second artifact under revision control of a second repository.

5. The method of claim 1, wherein the first information comprises access information to at least one specific revision of the at least one artifact.

6. The method of claim 1, wherein the second information comprises access information to at least one specific revision of the at least one other artifact tuple.

7. The method of claim 1, wherein maintaining under revision control a plurality of artifact tuples further comprises updating the first information in response to maintenance of a given one of the at least one artifacts.

8. The method of claim 7, wherein maintaining under revision control a plurality of artifacts comprises creating a new version of an artifact to create the given artifact, and maintaining a plurality of artifact tuples further comprises creating a new given artifact tuple having the updated first information, the updated first information providing access to the given artifact.

9. The method of claim 1, wherein each given repository has revision control of artifacts in the given repository but does not have revision control of artifacts outside the given repository.

10. An apparatus supporting collaborative product development, the apparatus comprising:
    at least one memory; and
    at least one processor coupled to the at least one memory, the at least one processor configured to perform the steps of:
    maintaining under revision control, in a plurality of repositories, a plurality of artifacts;
    maintaining under revision control, in another repository, a plurality of artifact tuples, at least one first artifact tuple comprising first information providing access to at least one of the artifacts, and at least one second artifact tuple comprising second information providing access to at least one other artifact tuple; and
    associating each of the artifact tuples with at least one of a plurality of product development processes;
    wherein maintaining under revision control a plurality of artifact tuples further comprises updating the second information in response to maintenance of a given one of the at least one other artifact tuples, and further comprises creating a new version of one of the at least one other artifact tuples to create the given other artifact tuple, and creating a new given artifact tuple having the updated second information, the updated second information providing access to the given other artifact tuple.

11. A program storage device tangibly embodying a program of machine-readable instructions executable by a digital processing apparatus to perform operations supporting collaborative product development, the operations comprising:
    maintaining under revision control, in a plurality of repositories, a plurality of artifacts;
    maintaining under revision control, in another repository, a plurality of artifact tuples, at least one first artifact tuple comprising first information providing access to at least one of the artifacts, and at least one second artifact tuple comprising second information providing access to at least one other artifact tuple; and
    associating each of the artifact tuples with at least one of a plurality of product development processes;
    wherein maintaining under revision control a plurality of artifact tuples further comprises updating the second information in response to maintenance of a given one of the at least one other artifact tuples, and further comprises creating a new version of one of the at least one other artifact tuples to create the given other artifact tuple, and creating a new given artifact tuple having the updated second information, the updated second information providing access to the given other artifact tuple.

* * * * *